United States Patent
Chainani et al.

(10) Patent No.: US 11,494,408 B2
(45) Date of Patent: Nov. 8, 2022

(54) ASYNCHRONOUS ROW TO OBJECT ENRICHMENT OF DATABASE CHANGE STREAMS

(71) Applicant: Salesforce.com, Inc., San Francisco, CA (US)

(72) Inventors: Mikhail Chainani, San Francisco, CA (US); Xiaodan Wang, Dublin, CA (US); Vijayanth Devadhar, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 258 days.

(21) Appl. No.: 16/581,253

(22) Filed: Sep. 24, 2019

(65) Prior Publication Data

US 2021/0089556 A1    Mar. 25, 2021

(51) Int. Cl.
*G06F 16/27* (2019.01)
*G06F 16/23* (2019.01)
*G06F 16/22* (2019.01)

(52) U.S. Cl.
CPC ........ *G06F 16/273* (2019.01); *G06F 16/2282* (2019.01); *G06F 16/2358* (2019.01); *G06F 16/2379* (2019.01)

(58) Field of Classification Search
None
See application file for complete search history.

(56) References Cited

U.S. PATENT DOCUMENTS

| | | |
|---|---|---|
| 7,111,023 B2 | 9/2006 | Norcott |
| 8,793,691 B2 | 7/2014 | Devadhar |
| 8,838,526 B2 | 9/2014 | Devadhar |
| 8,875,152 B2 | 10/2014 | Devadhar et al. |
| 9,201,696 B2 | 12/2015 | Yang et al. |
| 9,229,793 B2 | 1/2016 | Devadhar |
| 9,268,605 B2 | 2/2016 | Wang et al. |
| 9,305,070 B2 | 4/2016 | Zhu et al. |
| 9,348,648 B2 | 5/2016 | Wang et al. |
| 9,519,547 B2 | 12/2016 | Devadhar |
| 9,529,626 B2 | 12/2016 | Wang et al. |
| 9,632,852 B2 | 4/2017 | Kwong et al. |

(Continued)

FOREIGN PATENT DOCUMENTS

CA    2883883 A1    3/2014

OTHER PUBLICATIONS

Oracle Database Advanced Application Developer's Guide, Dec. 2014.
Oracle Database Backup and Recovery User's Guide, Jun. 2010.

*Primary Examiner* — Scott A. Waldron
(74) *Attorney, Agent, or Firm* — Polygon IP, LLP

(57) ABSTRACT

A first copy of a database object may be constructed prior to applying a designated database update request to a first database. The database object may be represented by a plurality of database table rows in the first database, and the request may update one or more of the plurality of rows. The request may be applied to the first database to update the one or more of the plurality of rows in the first database. A second copy of the database object may be constructed after applying the database update request to the first database. A message identifying a difference between the first copy of the database object and a second copy of the database object may be transmitted to a remote computing device.

20 Claims, 9 Drawing Sheets

(56) References Cited

U.S. PATENT DOCUMENTS

| | | |
|---|---|---|
| 9,766,960 B2 | 9/2017 | Wang |
| 9,813,516 B2 | 11/2017 | Wang |
| 9,858,187 B2 | 1/2018 | Sundaravaradan et al. |
| 9,923,960 B2 | 3/2018 | Helmich et al. |
| 9,984,002 B2 | 5/2018 | Sundaravaradan et al. |
| 9,990,400 B2 | 6/2018 | Sundaravaradan et al. |
| 10,013,294 B2 | 7/2018 | Kwong et al. |
| 10,013,501 B2 | 7/2018 | Sundaravaradan et al. |
| 10,019,297 B2 | 7/2018 | Helmich et al. |
| 10,140,153 B2 | 11/2018 | Wang |
| 10,169,090 B2 | 1/2019 | Wang |
| 10,334,033 B2 | 6/2019 | Helmich et al. |
| 2003/0220935 A1* | 11/2003 | Vivian .................... G06F 16/27 |
| 2004/0098425 A1* | 5/2004 | Wiss ...................... G06F 16/275 |
| 2004/0133591 A1* | 7/2004 | Holenstein .......... G06F 11/2079 |
| 2012/0030172 A1* | 2/2012 | Pareek .................. G06F 16/275 |
| | | 707/635 |
| 2013/0006932 A1* | 1/2013 | Akulavenkatavara ....................... |
| | | G06F 16/273 |
| | | 707/626 |
| 2014/0075017 A1 | 3/2014 | Wang et al. |
| 2015/0046279 A1 | 2/2015 | Wang |
| 2015/0120659 A1* | 4/2015 | Srivastava .......... G06F 11/2038 |
| | | 707/625 |
| 2015/0326650 A1 | 11/2015 | Yang et al. |
| 2016/0080273 A1 | 3/2016 | Yang et al. |
| 2016/0119244 A1 | 4/2016 | Wang et al. |
| 2016/0119246 A1 | 4/2016 | Wang |
| 2016/0314046 A1* | 10/2016 | Kumarasamy ...... G06F 11/1451 |
| 2017/0286472 A1* | 10/2017 | Cadarette ............ G06F 16/2358 |
| 2018/0063271 A1 | 3/2018 | Wang |
| 2018/0144015 A1* | 5/2018 | MitturVenkataramanappa ........... |
| | | G06F 11/1471 |
| 2018/0268017 A1* | 9/2018 | Parikh ..................... G06F 16/27 |
| 2018/0322306 A1 | 11/2018 | Obembe et al. |
| 2018/0329793 A1 | 11/2018 | Obembe et al. |
| 2018/0331887 A1 | 11/2018 | Obembe et al. |
| 2019/0057133 A1 | 2/2019 | Chainani et al. |
| 2019/0065542 A1 | 2/2019 | Baker et al. |
| 2019/0095249 A1 | 3/2019 | Wang |
| 2019/0235895 A1 | 8/2019 | Ovesea et al. |
| 2019/0235918 A1 | 8/2019 | Liu et al. |
| 2019/0236150 A1 | 8/2019 | Zaslavsky et al. |
| 2019/0236201 A1 | 8/2019 | Wang et al. |
| 2020/0117680 A1* | 4/2020 | Bapat ....................... G06F 9/546 |

\* cited by examiner

ASYNCHRONOUS ROW TO OBJECT ENRICHMENT OF DATABASE CHANGE STREAMS

FIELD OF TECHNOLOGY

This patent document relates generally to database systems and more specifically to detecting computing system events based on metrics stored in database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Database systems implemented in cloud computing environments are capable of producing change streams. Change streams document changes to individual database rows, which applications may access to perform a variety of operations. For example, applications can use change streams to subscribe to data changes to specific rows or tables, and then use the information to perform application-specific operations.

BRIEF DESCRIPTION OF THE DRAWINGS

The included drawings are for illustrative purposes and serve only to provide examples of possible structures and operations for the disclosed inventive systems, apparatus, methods and computer program products for row to object enrichment in change streams implemented in database systems. These drawings in no way limit any changes in form and detail that may be made by one skilled in the art without departing from the spirit and scope of the disclosed implementations.

DETAILED DESCRIPTION

Figure 1:
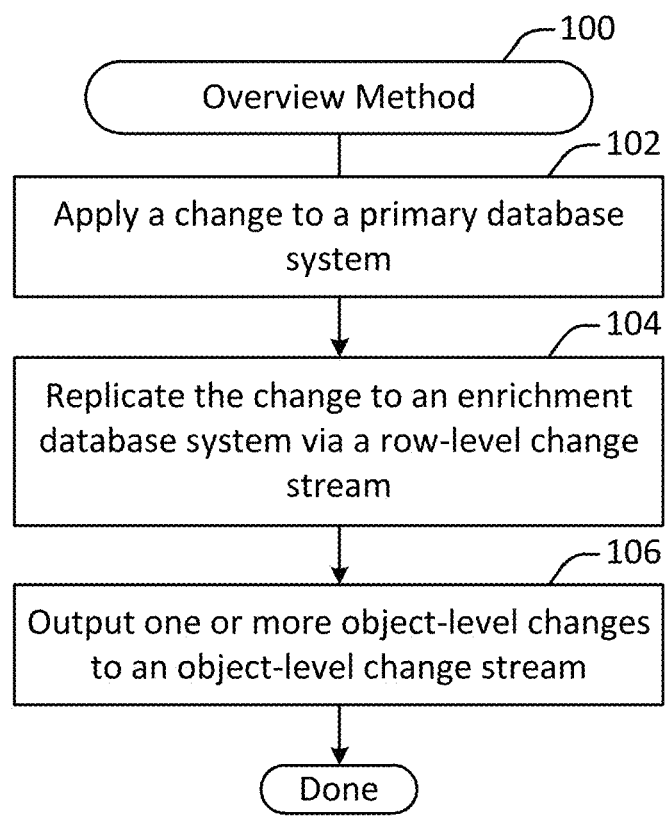
FIG. 1 illustrates an example of an overview method for generating an object-level change stream, performed in accordance with one or more embodiments.

Techniques and mechanisms described herein provide for the conversion of row-level database changes to object-level changes. According to various embodiments, techniques and mechanisms described herein may leverage existing change data capture technologies and an enrichment database in order to build (or enrich) the object-level change. Such object-level changes may be built asynchronously. In turn, applications can access object-level change capture without sacrificing the scalability benefits of row-level change capture or incurring additional overhead on customer traffic.

Conventional databases can output row-level change streams that identify to one or more subscribers changes that have occurred within a database. However, in sophisticated databases an individual data object may be composed of multiple rows of data from potentially several different database tables. For example, a cloud computing environment may operate on objects backed by a relational database by using Object-Relational Mapping (ORM) to provide a one-way mapping from application objects to database tables and rows. Such an approach allows objects to span multiple physical tables and rows and, in some configurations, for multiple tenants to share the same set of physical tables. Because conventional change detection solutions only capture row-level changes, such approaches are not suitable for customer facing use cases that consume changes at an object level.

Techniques and mechanisms described herein leverage the scalability benefits of row-level change capture while retaining the expressiveness of the object-level view. An enrichment database may be employed to offload computation from the primary database, thereby minimizing impact to customer traffic. The change replication lag between the primary and enrichment database may be exploited in order to convert from row-level to object-level changes. This conversion may apply a replication process that does not require change to applications or the ORM.

In theory, one approach to capturing object-level changes would be to simply rebuild the object-level change when a row-level change is detected. However, conventional database change capture technologies capture row-level changes asynchronously. By the time a change to one database row is detected a different database row associated with the same object may have been changed as well, or an entire field in one of the database rows may have been deleted. In either case, the system would have lost the opportunity to construct the object-level view change to the first database row.

Another potential solution would be to capture database changes synchronously by injecting application specific code into the database data manipulation language (DML) path. For example, database triggers could be added to construct the object-level view at the same time as the row-level change. However, such approaches face scalability limitations because database triggers introduce additional computation overhead on the primary database that is serving customer traffic. Moreover, injecting code to construct the object-level view in the critical path of a customer's transaction negatively impacts customer response time. Row-level change capture techniques avoid these scalability pitfalls because they inspect database redo log files for changes after the fact. This allows computation to be offloaded from the primary database, thereby minimizing any impact to customer traffic.

According to various embodiments, techniques and mechanisms described herein may provide for a database system that is capable of outputting an object-level change stream. The object-level change stream may be provided without incurring additional computing costs in the primary database, since the object-level change stream may be dynamically and asynchronously constructed from a row-level change stream already output by the primary database. Accordingly, techniques and mechanisms described herein may effectively expand the functionality of an existing database system without imposing additional computing costs on that system.

According to various embodiments, techniques and mechanisms described herein may be implemented without changing an existing object relational mapping system in a database environment. Techniques and mechanisms described herein may also be implemented without imposing additional computing workload on the primary database.

According to various embodiments, when ORM is employed, the same column in the database may store different data in one row than in another row. For example, one database table row may store a contact object, in which a particular column corresponds to a contact name. At the same time, a different database table row in the same database may store an organization object, in which the same column corresponds to an organization street address. ORM may be used to dynamically determine the contents of a column based on information such as the object type. Techniques and mechanisms described herein are described with respect to databases configured for ORM, since this is the more complex and general case. However, techniques and mechanisms described herein are generally applicable to a wide range of database systems, including conventional database systems in which each row of a database table stores the same type of information as all other rows in the database table.

As an example, consider the situation of Alexandra, an application developer responsible for an application that notifies a customer support representative when a customer contact changes. When using conventional techniques, Alexandra could configure the application to periodically query the database for changes. However, such an approach would require frequent queries and impose considerable delay when detecting changes. As another approach, the application could monitor a row-level database change stream for changes. However, each customer contact object is composed of multiple rows in the database, while the application operates at the object level and cannot assemble the corresponding object from a row-level change without introducing substantial application complexity in the underlying ORM model.

In contrast, using techniques and mechanisms described herein, the application could monitor an object-level change stream for changes to customer contact objects. Any change to a customer contact object would be represented in the change stream as an insertion deletion, or update operation to a portion of an object, or an insertion or deletion of an entire object. In this way, the application could be informed of object-level changes without needing to query the relational database or needing to access data via the underlying ORM model.

FIG. 1 illustrates an example of an overview method 100 for generating an object-level change stream, performed in accordance with one or more embodiments. According to various embodiments, the method 100 may be performed at a computing system configured to implement a database system. Examples of computing systems and on-demand computing services environment in which the method 100 may be implemented are discussed with respect to the systems shown in FIGS. 6, 7, 8, and 9.

A change is applied to a primary database system at 202. According to various embodiments, the change may be any suitable modification. For example, a data value in a row may be updated. As another example, a field in a row may be added or removed. As still another example, a row in a database table may be added or removed. Additional details regarding applying a change to a primary database table are discussed with respect to the method 300 shown in FIG. 3.

The change is replicated to an enrichment database system via a row-level change stream 104. In some implementations, the change may be replicated by a replication controller, as described with respect to FIG. 2. Additional details regarding creating an enrichment database system are discussed with respect to the method 400 shown in FIG. 4. Additional details regarding replicating a change to an enrichment database system via a row-level change stream are described with respect to the database systems architecture 200 shown in FIG. 2 and the object-level change data capture method 500 shown in FIG. 5.

One or more object-level changes are determined and output to an object-level change stream at 106. In some implementations, the object-level changes may be identified by comparing a first object constructed from the enrichment database before replicating the row-level change to a second object constructed from the enrichment database after replicating the row-level change. Additional details regarding determining and outputting an object-level change stream are described with respect to the object-level change data capture method 500 shown in FIG. 5.

Figure 2:
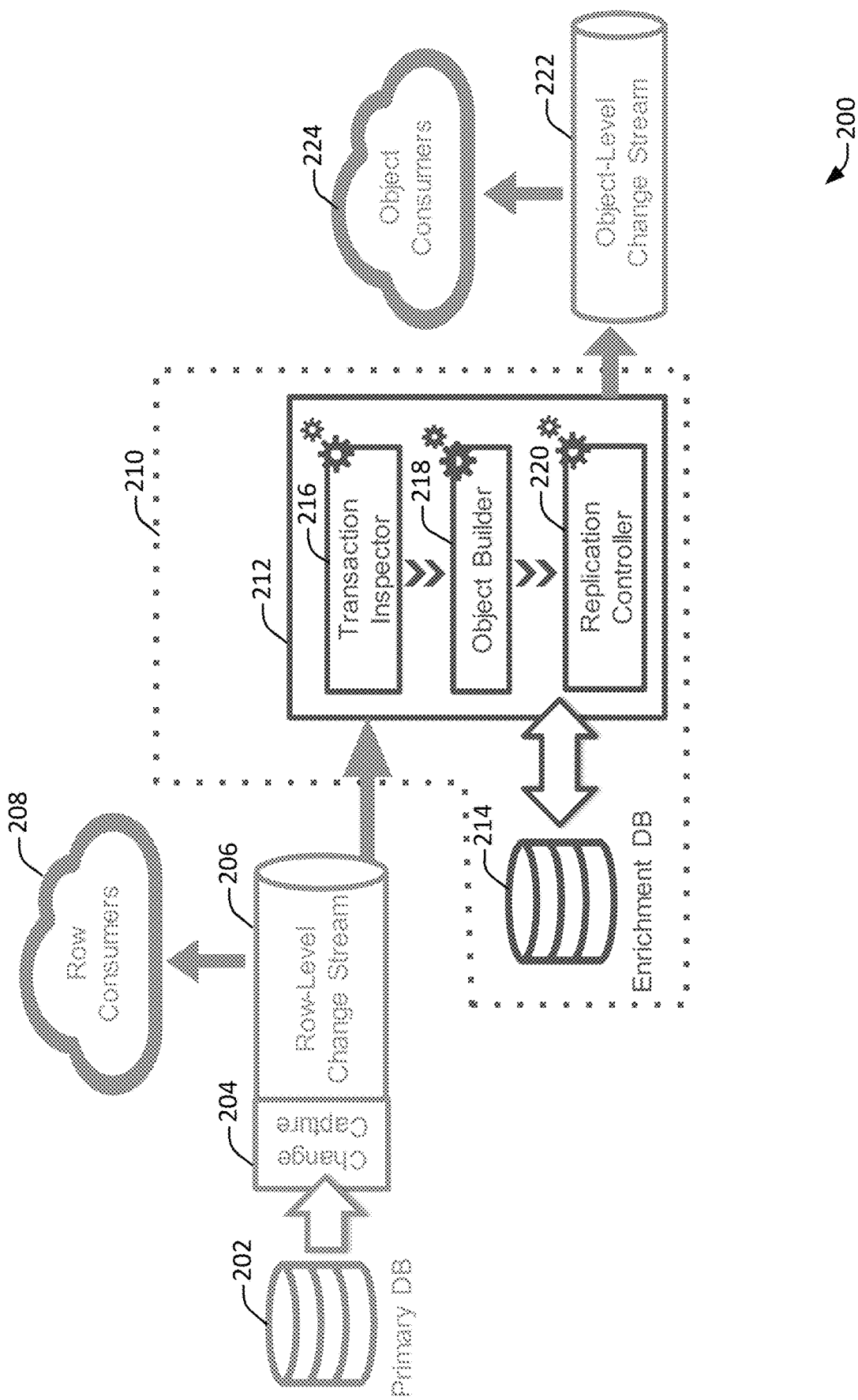
FIG. 2 illustrates an example of a database systems architecture for generating an object-level change stream, configured in accordance with one or more embodiments.

FIG. 2 illustrates an example of a database systems architecture 200 for generating an object-level change stream, configured in accordance with one or more embodiments. The database systems architecture 200 may be implemented in a computing environment such as an on-demand computing services environment configured to provide computing services to a variety of clients via the Internet.

The database systems architecture 200 includes a primary database 202 configured to output row-level changes to a change capture bus 204, which is configured to output a row-level change stream 206. One or more consumers 208 may consume the row-level changes. The database systems architecture 200 also includes an object-level change data enrichment system 210. The object-level change data enrichment system 210 includes an enrichment database 214 and an enrichment engine 212. The enrichment engine 212 includes a transaction inspector 216, an object builder 218, and a replication controller 220. The object-level change data enrichment system 210 is configured to output an object-level change stream 222, which may be consumed by one or more object consumers 224.

According to various embodiments, the primary database 202 may be configured in accordance with any of a variety of database systems. For example, the primary database 202 may be configured as a multitenant database. As another example, the primary database 202 may be configured in accordance with ORM. The primary database 202 may include one or more different database tables configured to store data relating to any of a variety of database objects. For instance, data associated with a customer relations management (CRM) system, data associated with a social networking system, and/or data associated with a marketing system may be stored in the database.

In some implementations, the change-capture bus 204 may capture row-level changes that have been made to the primary database. In some configurations, one or more commercially available row-level change capture solutions may be employed, such as the GoldenGate and/or the Log Miner systems available from Oracle Corporation of Redwood Shores, Calif. The change-capture bus 204 may output a row-level change stream 206.

In some embodiments, the row-level change stream may identify, in a granular fashion, individual changes to database rows in database tables in the primary database 202. For example, an entry in a row-level change stream may indicate that one or more values in a particular row in a database table were updated. As another example, another entry may indicate that a column in a database table was added or removed. As still another example, yet another entry may indicate that a database row was added or removed.

The row-level consumers 208 may include any recipients that monitor the row-level change stream 206. For example, one such consumer may be a replication engine configured to replicate changes made to the primary database to a secondary database. Such replication may facilitate backup or load sharing. As another example, another such consumer may be a security application monitoring changes to the primary database 202. As still another example, another such consumer may be a notification application configured to transmit a notification to a user whenever a change to a designated database table is observed.

In particular embodiments, a row consumer 208 may subscribe to all or a portion of the row-level change stream. For example, a row consumer 208 may receive a notification only when a designated data table is changed, rather than whenever a change is made to any database table. As another example, a row consumer 208 may monitor changes to particular columns within a database table.

In some implementations, the object-level change data enrichment system 210 may monitor the row-level change stream for changes for the purpose of performing row-to-object enrichment. Changes detected by the object-level change data enrichment system 210 may be stored to the enrichment database 214. The enrichment database 214 is a database that is separate from the primary database 202 and that contains a subset of tables and rows from the primary database 202. In particular, the enrichment database 214 includes rows and tables that are involved in materializing the objects subject to change capture.

According to various embodiments, the transaction inspector 216 inspects changes from the row-level change stream 206 and triggers the enrichment workflow when an object of interest has changed. For example, the transaction inspector 216 may monitor the row-level change stream 206 to identify a subset of the row-level changes to rows that are included in objects that the object-level change data enrichment system 210 is configured to change capture.

According to various embodiments, the object builder 218 may build an object-level view of the change. The object builder 218 may be configured to communicate with the enrichment database to construct an object based on ORM. For instance, the object builder 218 may consult a data dictionary to determine that a designated object includes different rows from various database tables. When the transaction inspector 216 identifies a change to a focal row, the object builder may consult the data dictionary to identify the other rows that are associated with the object of which the focal row is a part. The object builder may then combine the data from the different rows to construct a copy of the object. The object may be any suitable data object, composed of data fields and properties configured in any suitable manner.

In some implementations, the replication controller 220 applies relevant row-level changes to the enrichment database. For example, when the transaction inspector 216 detects a row-level change to a designated object the object builder 218 may build a first copy of the designated object from the enrichment database 214. The replication controller 220 may then apply the row-level change (e.g., an insertion, deletion, or update statement) to the enrichment database 214. The object builder 218 may then build a second copy of the designated object from the enrichment database 214. The difference between the first and second copies may be output to the object-level change stream 222.

The object consumers 224 may include any recipients that monitor the object-level change stream 222. For example, one such consumer may be a security application monitoring changes to objects in the primary database 202. As another example, another such consumer may be a notification application configured to transmit a notification to a user whenever a change to a designated database object is observed.

In particular embodiments, an object consumer 224 may subscribe to all or a portion of the object-level change stream. For example, an object consumer 224 may receive a notification only when an object of a designated type is changed, rather than whenever a change is made to any object. As another example, an object consumer 224 may monitor changes to particular object fields.

Figure 3:
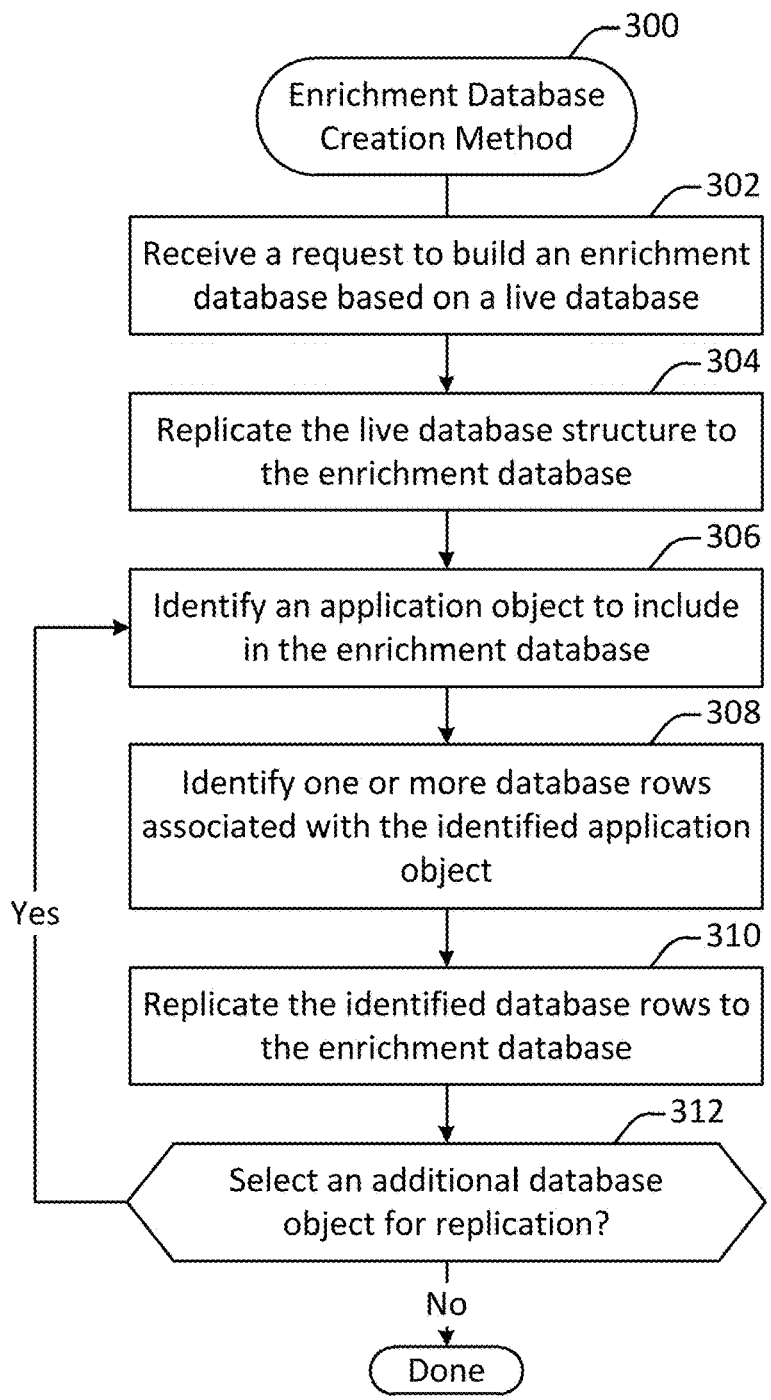
FIG. 3 illustrates an example of a method for creating an enrichment database, performed in accordance to one or more embodiments.

FIG. 3 illustrates an example of a method 300 for creating an enrichment database, performed in accordance to one or more embodiments. The method 300 may be performed as part of a configuration process for object-level change capture. In some instances, the method 300 may be performed in order to alter an existing enrichment database rather than to create a new enrichment database.

In some implementations, the method 300 may be used to instantiate and seed an enrichment database, such as the enrichment database 214 shown in FIG. 2, with tables and rows from the primary database corresponding to objects for which change capture has been requested. In this way, computation may be offloaded from the primary database, and object-level change capture may be performed in an asynchronous manner.

A request to build an enrichment database based on a live database is received at 302. According to various embodiments, the request may be received as part of a configuration procedure for configuring object-level change capture. The request may include criteria for configuring the enrichment database. Such criteria may include, but are not limited to, object types, object identifiers, tenant identifiers, or other such categories for identifying objects subject to change capture. For example, the request may identify contact objects belonging to a particular organization as being a target for object-level change data capture.

The live database structure is replicated to the enrichment database at 304. In some implementations, replicating the live database structure to the enrichment database may involve creating in the enrichment database the same tables present in the live database. Each table may include some number of columns, which may be created in the corresponding tables in the enrichment database.

An application object to include in the enrichment database is identified at 306. In some implementations, the application object may be identified based on the criteria described with respect to the operation 302. For example, the application object may be identified based on its type, its identifier, or an organization such as a database tenant with which the object is associated.

One or more database rows associated with the identified application object are identified at 308. In some implementations, the one or more database rows associated with the identified application object may be identified by querying the primary database based on selection criteria associated with the identified application object. For example, one or more object identifiers may be used to select rows associated with those identifiers.

The identified database rows are replicated to the enrichment database at 310. According to various embodiments, replicating the identified database rows may involve copying the data stored in those rows to the corresponding database tables constructed as described with respect to the operation 304.

At 312, a determination is made as to whether to select an additional database object for replication. According to various embodiments, successive database objects may be selected until all objects that meet the criteria identified at 306 have been replicated. In some implementations, objects may be identified and replicated to the enrichment database in parallel, in sequence, or in any suitable order.

Figure 4:
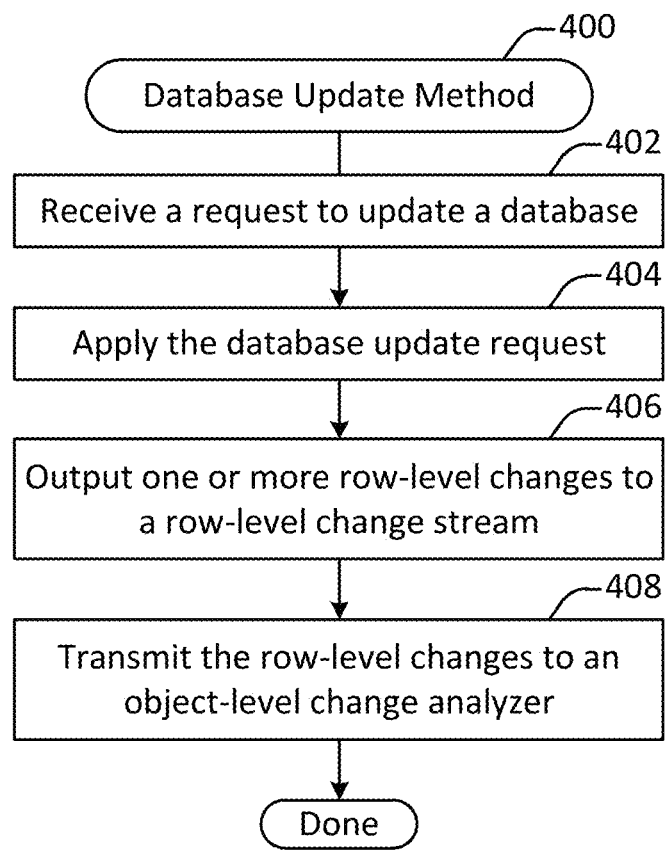
FIG. 4 illustrates an example of a method for updating a database, performed in accordance with one or more embodiments.

FIG. 4 illustrates an example of a method 400 for updating a database, performed in accordance with one or more embodiments. In some implementations, the method 400 may be performed at a database system, such as a system configured in accordance with the architecture 200 shown in FIG. 2.

A request to update a database is received at 402. According to various embodiments, the request may be any type of database update request. For example, the request may be a request to update one or more values in one or more database table rows. As another example, the request may be a request to insert or delete a row. As another example, the request may be a request to alter the structure of a database table.

In some implementations, the request received at 402 may be received as part of a database script. Alternately, the request may be received through an application procedure interface (API) call. For example, an application implemented in an on-demand computing services environment may transmit a request to update the database via the API.

The database update request is applied at 404. According to various embodiments, the database request may be applied by the database by executing the request against one or more database tables.

One or more row-level changes are output to a row-level change stream at 406. In some implementations, outputting the one or more row-level changes to the row-level change stream may involve identifying a before and after value for each value changed by the database update request, and transmitting those values to a change bus as described with respect to FIG. 2. The change bus may then format those changes for transmission to one or more subscribers to the row-level change stream. Each entry in the row-level change stream may include information such as the database table associated with the change, the database row associated with the change (e.g., via an index), an object identifier associated with the row, one or more columns that have been changed, one or more updated values, and/or one or more original values.

The row-level changes are transmitted to an object-level change analyzer at 408. As discussed with respect to the architecture 200 shown in FIG. 2, a transaction inspector may monitor the row-level change stream for changes to rows that store data associated with objects being monitored for object-level change stream generation. Additional details regarding this procedure are discussed with respect to the method 500 shown in FIG. 5.

Figure 5:
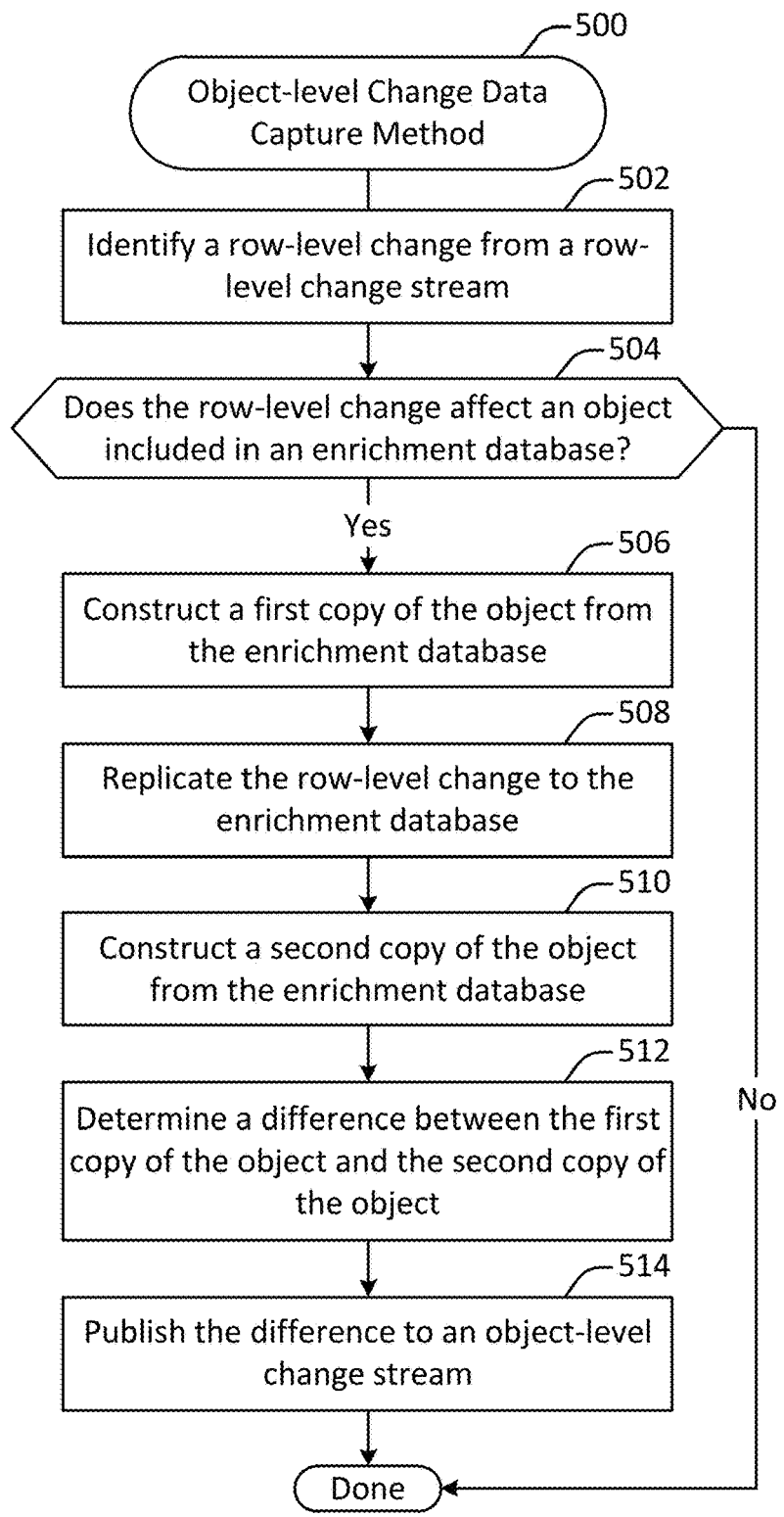
FIG. 5 illustrates an example of a method for generating an object-level change stream, performed in accordance to one or more embodiments.

FIG. 5 illustrates an example of a method 500 for generating an object-level change stream, performed in accordance to one or more embodiments. According to various embodiments, the method 500 may be performed in a computing system. For example, the method 500 may be performed at the object-level change data enrichment system 210 shown in FIG. 2.

Figure 6:
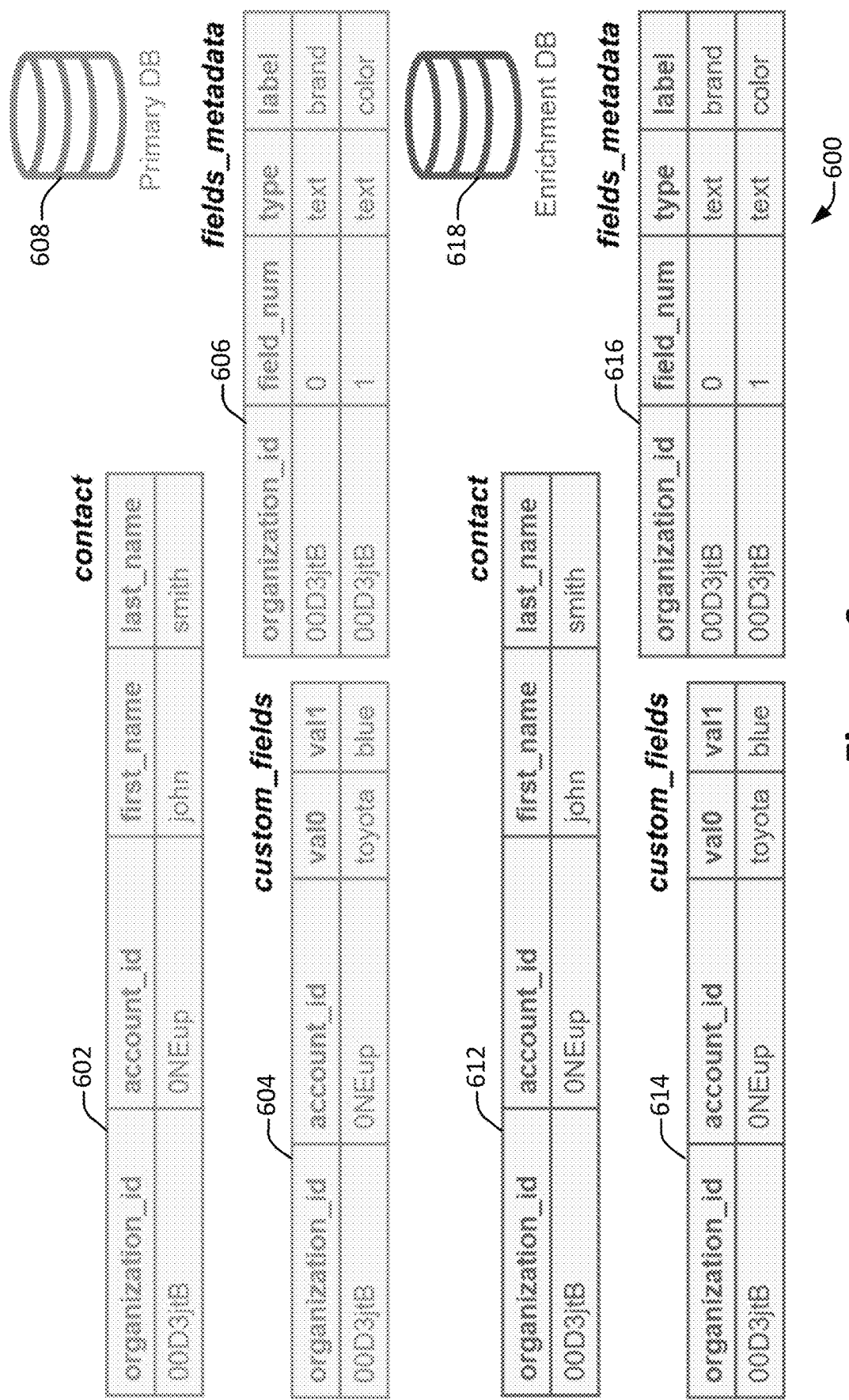
FIG. 6 illustrates an example of data stored in a database system, arranged in accordance to one or more embodiments.

FIG. 5 will be described partially in reference to FIG. 6. FIG. 6 illustrates an example of data 600 stored in a database system, arranged in accordance to one or more embodiments. The arrangement of data 600 represents a contact object spread over three data tables. These data tables include the contact table 602, the custom fields table 604, and the fields metadata table 606 in the primary database 608. The three data tables are replicated to the contact table 612, the custom fields table 614, and the fields metadata table 616 in an enrichment database 618.

FIG. 6 presents a simple example for the purpose of illustration. According to various embodiments, actual database systems may include objects that span potentially many rows in many different database tables. Each row may include potentially many different data values stored in many different columns.

A row-level change is identified from a row-level change stream at 502. According to various embodiments, the row-level change may be identified by inspecting some or all of the changes included in the row-level change stream 206 shown in FIG. 2. Such an inspection may be performed by, for instance, the transaction inspector 216 shown in FIG. 2. As discussed with respect to FIG. 2, each change may indicate information such as a the database table associated with the change, the database row associated with the change (e.g., via an index), an object identifier associated with the row, one or more columns that have been changed, one or more updated values, and/or one or more original values. An example of a row-level change would be, for instance, a database update request that changes val1 in table 604 in FIG. 6 from "blue" to "red."

According to various embodiments, the database update request that is identified at 502 has already been applied to the primary database. In some configurations, database transactions may be applied synchronously to the primary database, and asynchronously to the enrichment database.

At 504, a determination is made as to whether the row-level change affects an object included in an enrichment database. According to various embodiments, the determination may be made in any of various ways. For example, the transaction inspector may use a portion of the row-level change entry, such as an organization identifier coupled with an object identifier, to query an enrichment database, such as the enrichment database 214 shown in FIG. 2. As another example, the transaction inspector may evaluate the row-level change entry to determine whether the entry meets one or more criteria, such as having an organization id on a list of organization identifiers for which change data capture at the object level is enabled.

If such an object is affected by the change, then at 506 a first copy of the object is constructed from the enrichment database. According to various embodiments, the first copy of the object may be constructed by querying a data dictionary to perform object relational mapping. The copy of the object may be constructed by, for instance, the object builder 218 shown in FIG. 2.

In some implementations, the object relational mapping may specify a mapping from the database tables associated with the object and the structure of the object itself. For example, in FIG. 6, a contact object is identified by an organization identifier and an account identifier. The contact table 602 stores the contact's name, as well as potentially other information not shown in FIG. 6. The custom fields table 604 stores custom data fields associated with the contact object. For instance, the organization associated with the identifier 00D3jtB may have configured a custom contact object to include additional fields. In FIG. 6, these additional fields include the data values "toyota" and "blue" stored in columns "val0" and "val1". The fields metadata table 606 indicates that for the organization 00D3jtB, the custom field 0 (i.e., "val0") for the contact object is a text field that stores a brand, while the custom field 1 (i.e., "val1" for the contact object is a text field that stores a color. Object relational mapping information retrieved from a data dictionary may allow the object builder to combine these different tables into a unified "contact" data object that includes the contact's name in addition to the values "Toyota" and "blue" stored in "brand" and "color" fields. Again, it should be noted that in practice a database table may include many columns not shown in FIG. 6.

The row-level change is replicated to the enrichment database at 508. In some implementations, the row-level change may be replicated by updating the enrichment database to include the change reflected in the row-level change entry. For example the row-level change entry may be used to update one or more values, add one or more rows, delete one or more rows, or perform another such database operation to the enrichment database.

In the example provided above, in which a database update request that changes val1 in table 604 in FIG. 6 from "blue" to "red," the same change would be applied to the custom fields table 614 in the enrichment database. After the application of that change, the "val1" field in table 614 would also be storing "red."

A second copy of the object is constructed from the enrichment database at 510. According to various embodiments, the second copy may be constructed in a manner similar to that described with respect to the operation 506. However, because the second object is constructed after the row-level change was applied to the enrichment database at 508, the second object may differ in one or more ways from the first object.

A difference between the first copy of the object and the second copy of the object is determined at 512. According to various embodiments, the difference may be determined by comparing each field in the first object to the corresponding field in the second object. For instance, in the example described above, the old color of the contact object was blue, whereas the new color is red.

The difference is published to an object-level change stream at 514. For example, the difference may be published to the change stream 222 shown in FIG. 2. According to various embodiments, the difference may be published in any of various ways. For example, the published difference may include some or all of the object fields that did not change. In the above example, the change stream may include an entry such as the one that follows:

Contact object
    organization_id 00D3jtB
    account Id=ONEup
    first_name=john
    last_name=smith
    brand=toyota
    Old color=blue
    New color=red In some implementations, the difference may include fewer fields, such as only those fields that have changed. Such an approach may be desirable in certain contexts, for instance for larger objects. In such a configuration, the change stream in the above example may instead include an entry such as the one that follows:

Contact object
    organization_id 00D3jtB
    account Id=ONEup
    Old color=blue
    New color=red According to various embodiments, publishing the difference to an object-level change stream may involve transmitting the difference to a recipient such as an object-level change stream subscriber. The recipient may be a remote computing device. In some configurations, such devices may include a client machine associated with a client that accesses on-demand computing services via an on-demand computing services environment associated with the database. Alternately, or additionally, such devices may include a computing device within the on-demand computing services environment, such as a device configured to provide an application that executes within the on-demand computing services environment.

As an extension to the example described above, suppose that immediately after the database update request that changes val1 in table 604 in FIG. 6 from "blue" to "red," a second database update request deletes the second row from the fields metadata table 606. Such a change would result in the data stored in the custom field "val1" being deemed irrelevant when constructing a contact object. If changes to the database were captured by periodically querying the primary database, then the initial change from "blue" to "red" may be lost because the field may be deleted by the time the update query is performed. However, because techniques and mechanisms described herein rely on processing row-level changes output by the primary database, both the initial change from "blue" to "red" and the subsequent change that drops the custom "color" column entirely can be accurately captured.

Figure 7:
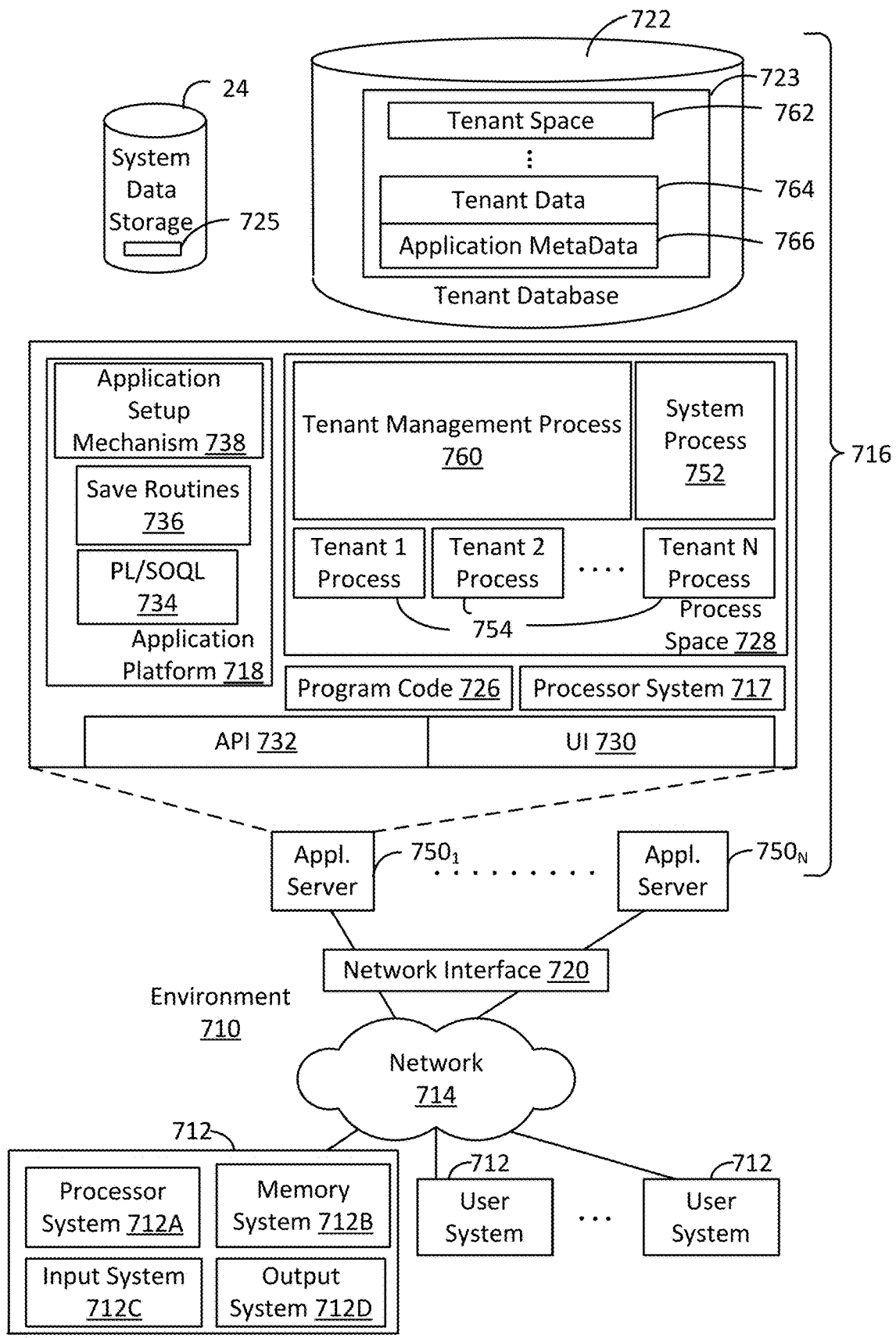
FIG. 7 illustrates a block diagram of an example of an environment that includes an on-demand database service configured in accordance with some implementations, configured in accordance with one or more embodiments.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760 tenant storage space 762, user storage 764 and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based database front end system. For example, in some implementations, system 716 may include application servers configured to implement and execute database queries. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an Internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a social networking system and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MIS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MIS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
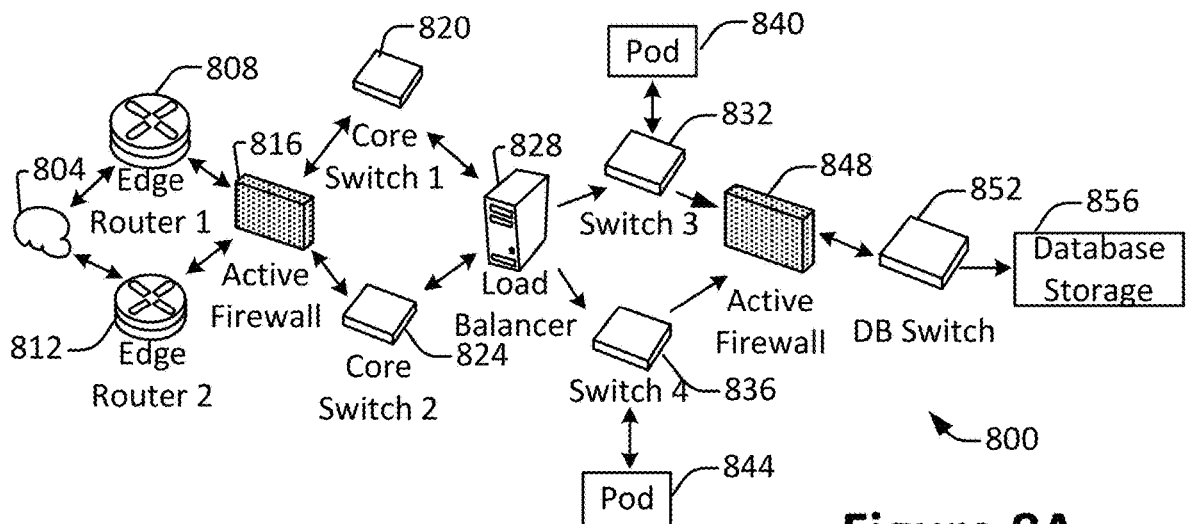
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems ?12 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process database query information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
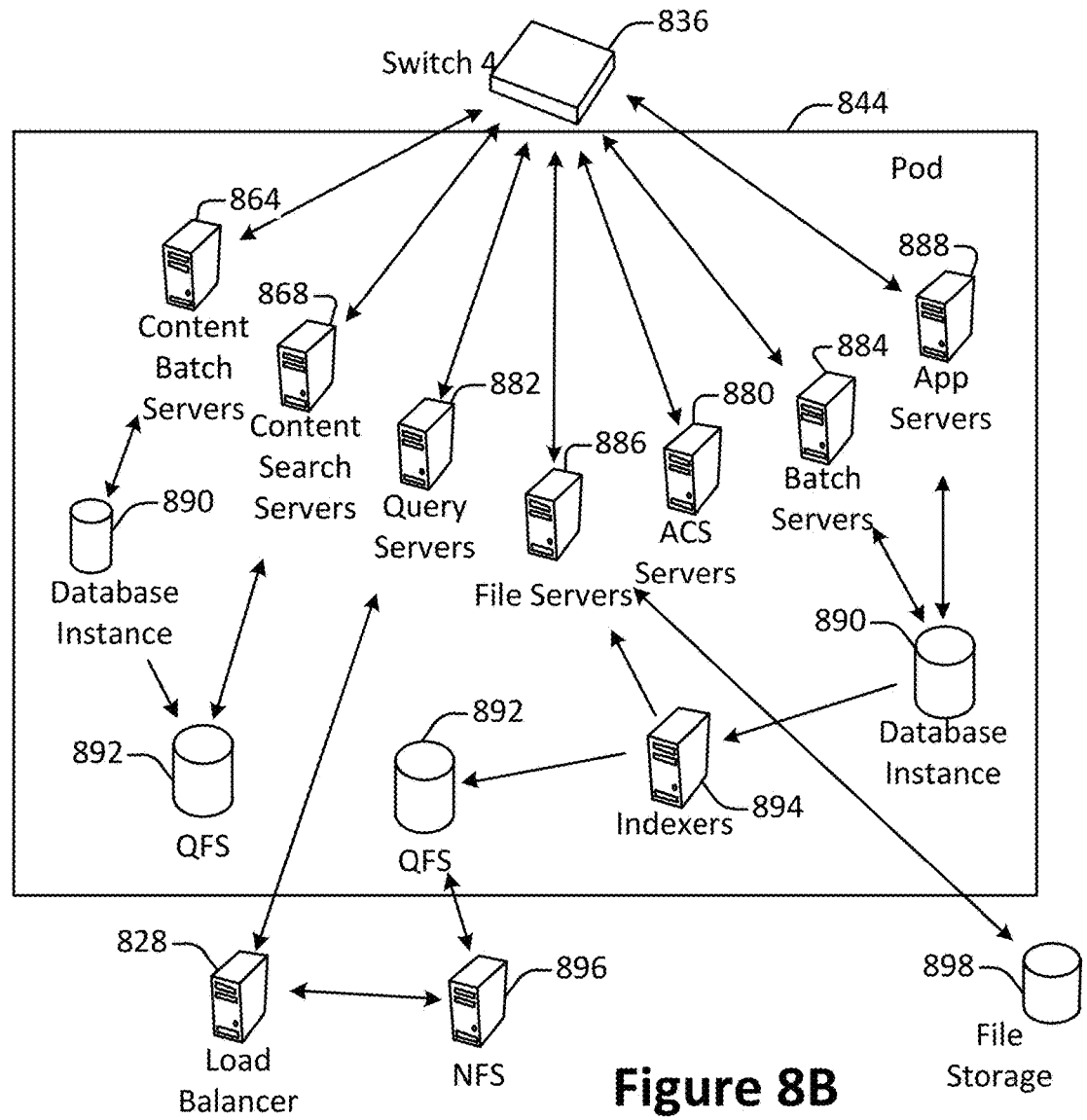
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898 which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
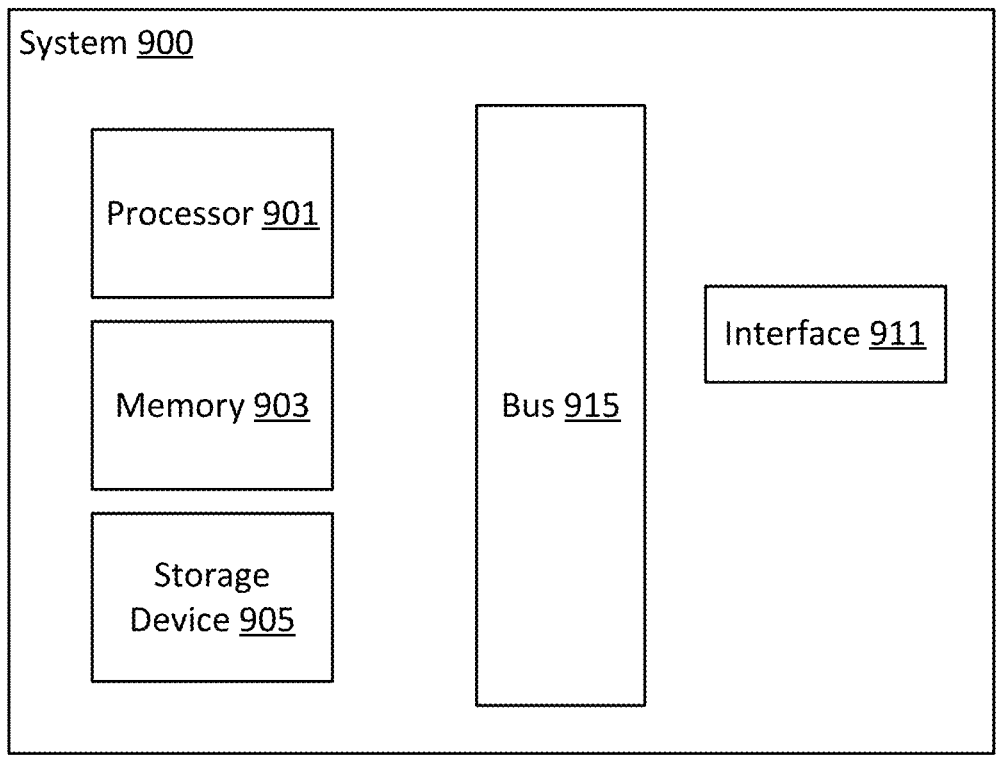
FIG. 9 illustrates one example of a computing device, configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A computer-implemented method implemented in a database system, the method comprising:
   receiving a database update request to update a database object including a plurality of data values associated with a plurality of fields, the database update request modifying a first subset of the plurality of data values;
   constructing via a processor a first copy of the database object based on information retrieved from a first database prior to applying the database update request;
   applying the database update request to the first database to update the database object;
   constructing via the processor a second copy of the database object based on information retrieved from the first database after applying the database update request to the first database;
   identifying a second subset of the plurality of data values that differ between the first copy of the database object and the second copy of the database object, the second subset of the plurality of data values including the first subset of the plurality of data values and a third subset of the plurality of data values; and
   transmitting to a remote computing device via a communications interface a message identifying the second subset of the plurality of data values.

2. The method recited in claim 1, wherein a second database replicates data stored in the first database.

3. The method recited in claim 2, wherein each of the first and second database are configured in accordance with a designated configuration structure, the designated configuration structure identifying one or more database tables, the designated configuration structure identifying one or more columns included in the identified one or more database tables.

4. The method recited in claim 2, wherein the database update request is determined by monitoring a row-level change stream that captures changes to the first database.

5. The method recited in claim 4, wherein the database update request is applied to the second database after a corresponding update request is applied to the first database.

6. The method recited in claim 4, wherein monitoring the row-level change stream comprises comparing one or more entries in the row-level change stream with one or more criteria, the one or more criteria identifying characteristics of objects for which to generate an object-level change stream.

7. The method recited in claim 1, wherein the database system is implemented in an on-demand computing services environment configured to provide computing services to a plurality of clients via the internet.

8. The method recited in claim 7, wherein the remote computing device is associated with a designated one of the plurality of clients.

9. The method recited in claim 7, wherein the remote computing device is located within the on-demand computing services environment, and wherein the remote computing device is configured to execute an application within the on-demand computing services environment, the application receiving the message identifying the second subset of the plurality of data values.

10. The method recited in claim 1, wherein constructing the first and second copies of the database object includes applying object relational mapping to map a plurality of database table rows to the database object.

11. The method recited in claim 1, wherein the database system includes a multitenant database configured to store information associated with a plurality of organizations in a designated database table.

12. A computer-implemented method implemented in a database system, the method comprising:
    receiving a database update request to update a database object including a plurality of data values associated with a plurality of fields, the database update request modifying a first subset of the plurality of data values;
    constructing via a processor a first copy of the database object based on information retrieved from a first database prior to applying the database update request;
    applying the database update request to the first database to update the database object;
    constructing via the processor a second copy of the database object based on information retrieved from the first database after applying the database update request to the first database;
    identifying a second subset of the plurality of data values that differ between the first copy of the database object and the second copy of the database object, the second subset of the plurality of data values including the first subset of the plurality of data values and a third subset of the plurality of data values; and
    transmitting to a remote computing device via a communications interface a message identifying the second subset of the plurality of data values.

13. The database system recited in claim 12, wherein a second database replicates data stored in the first database.

14. The database system recited in claim 13, wherein each of the first and second database are configured in accordance with a designated configuration structure, the designated configuration structure identifying one or more database tables, the designated configuration structure identifying one or more columns included in the identified one or more database tables.

15. The database system recited in claim 13, wherein the database update request is determined by monitoring a row-level change stream that captures changes to the first database.

16. The database system recited in claim 15, wherein the database update request is applied to the second database after a corresponding update request is applied to the first database.

17. The database system recited in claim 15, wherein monitoring the row-level change stream comprises comparing one or more entries in the row-level change stream with one or more criteria, the one or more criteria identifying characteristics of objects for which to generate an object-level change stream.

18. The database system recited in claim 12, wherein the database system is implemented in an on-demand computing services environment configured to provide computing services to a plurality of clients via the internet.

19. One or more non-transitory computer readable media having instructions stored thereon for performing a method, the method comprising:
    receiving a database update request to update a database object including a plurality of data values associated with a plurality of fields, the database update request modifying a first subset of the plurality of data values;
    constructing via a processor a first copy of the database object based on information retrieved from a first database prior to applying the database update request;
    applying the database update request to the first database to update the database object;
    constructing via the processor a second copy of the database object based on information retrieved from the first database after applying the database update request to the first database;
    identifying a second subset of the plurality of data values that differ between the first copy of the database object and the second copy of the database object, the second subset of the plurality of data values including the first subset of the plurality of data values and a third subset of the plurality of data values; and
    transmitting to a remote computing device via a communications interface a message identifying the second subset of the plurality of data values.

20. The one or more non-transitory computer readable media recited in claim 19, wherein a second database replicates data stored in the first database, wherein each of the first and second database are configured in accordance with a designated configuration structure, the designated configuration structure identifying one or more database tables, the designated configuration structure identifying one or more columns included in the identified one or more database tables, wherein the database update request is determined by monitoring a row-level change stream that captures changes to the first database, and wherein the database update request is applied to the second database after a corresponding update request is applied to the first database.

* * * * *